L. C. HAINS.
Cheese Vat.
No. 55,649. Patented June 19, 1866.
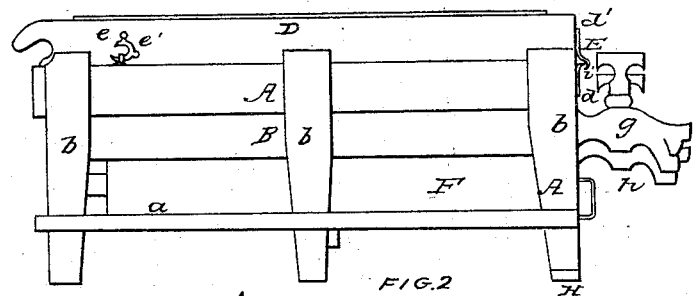
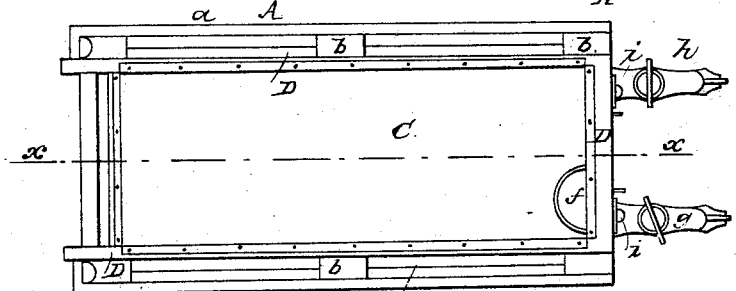
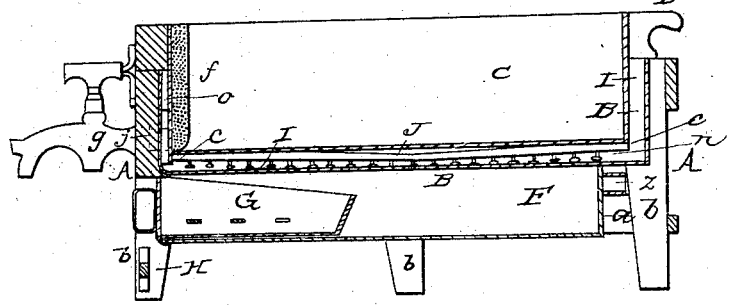
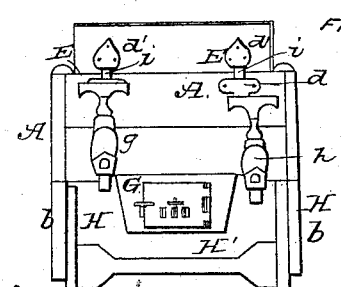
Witnesses
W. H. Burroughs
A. W. McClelland
Inventor
L C Hains

UNITED STATES PATENT OFFICE.

L. C. HAINES, OF BEDFORD, OHIO.

IMPROVEMENT IN CHEESE-VATS.

Specification forming part of Letters Patent No. 55,649, dated June 19, 1866.

*To all whom it may concern:*

Be it known that I, L. C. HAINES, of Bedford, in the county of Cuyahoga and State of Ohio, have invented certain new and useful Improvements in the Construction of Cheese-Vats; and I do hereby declare that the following is a full and complete description of the same, reference being had to the accompanying drawings, making a part of this specification, in which—

Figure 1 is a side elevation. Fig. 2 is a top view. Fig. 3 is a vertical section in the direction of the line $x$ $x$ in Fig. 2. Fig. 4 is a front-end view.

Like letters of reference refer to like parts in the several views.

A represents the frame of the vat, that consists of legs or standards $b$, attached to the upper portion of the frame, round the lower ends of which there may be a frame, $a$, and cross-pieces between them, to render the frame more firm and strong.

To the top of the frame is secured the bed or vat B, in which the pan C is placed. The pan is attached to a frame, D, hinged at the front to the frame of the vat, as seen at E, by lugs $d$ $d'$, the lower one of which forms a catch, as shown at $i$, in Fig. 1, and the upper one a hook, $i'$, that is hooked onto the catch, as represented, thereby forming detachable hinges.

Along the center of the pan, underneath it, there is a rib or brace, J, (seen in Fig. 3,) that is connected to the pan by the ends passing through loops $c$, attached to the pan. From the under side of the rib project pins $n$, that come against or rest upon the bottom of the vat. This prevents the pan from sagging down in the middle and crimping by the heat and weight of the milk, retaining it up in place.

$f$ is an adjustable screen at one end of the pan, that fits down into a slide over the hole from which the whey is drawn by the faucet $g$.

At the front end of the vat, each side, are holes, with which the faucets $g$ and $h$ are connected. The faucet $h$ is for drawing the water from the vat that is filled in the chamber I around the pan. In the hole leading into the faucet $g$ from the pan is a small pipe, as indicated by the dotted lines $j$ in Fig. 3. Around this pipe there is a gasket, $o$, that fits closely between the vat and pan, when the pan is hinged at the end and let down into the vat, forming a close, tight joint. When the pan is thus let down, it is retained steadily in place by a hook, $e$, on each side being inserted into a loop, $e'$, on top of the vat, as in Fig. 1.

Underneath the vat is a fire-chamber, F, in the front of which is the fire-box G, and at the rear a pipe, Z, that leads into the chimney.

To the front legs of the frame, inside, are pivoted adjustable legs H, connected by a cross-piece, H'. These legs, when turned down, extend below the legs of the vat, as shown in Fig. 1, and this is their position when the vat is level; but by turning them back the vat with the pan is inclined downward toward the front, which is very desirable in running off the whey and water.

What I claim as my improvement, and desire to secure by Letters Patent, is—

1. The detachable hinges E, in combination with the pan C and vat B, when arranged as and for the purpose set forth.

2. The brace-rib J, pins $n$, in combination with the pan C and vat, arranged as and for the purpose set forth.

L. C. HAINES.

Witnesses:
W. H. BURRIDGE.
A. W. MCCLELLAND.